March 26, 1957 C. S. MARDEN 2,786,263
APPARATUS FOR ASSEMBLING SHEATHED CABLE CONNECTORS
Filed Jan. 7, 1953 3 Sheets-Sheet 2

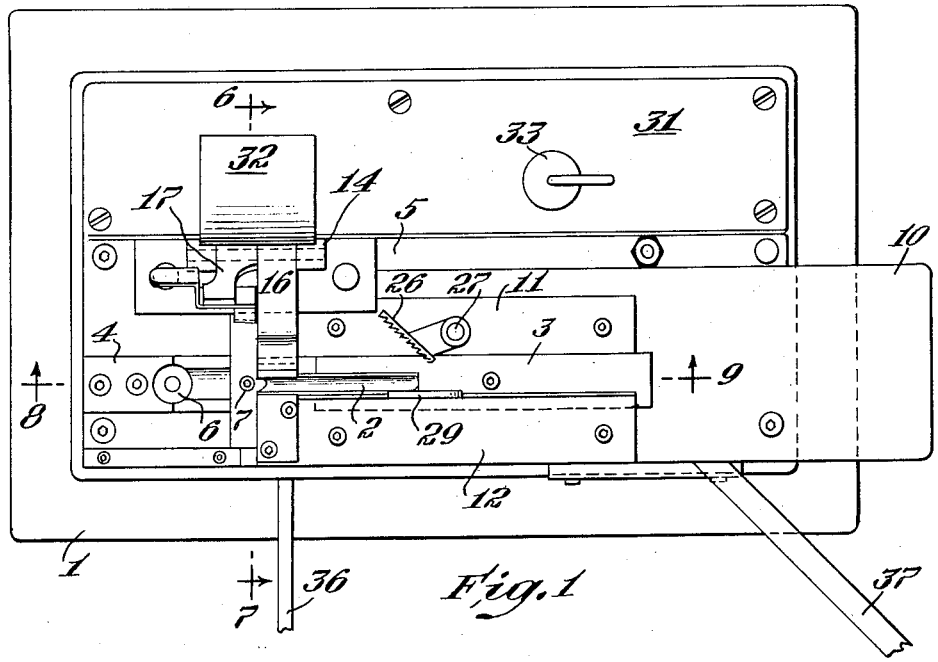

Inventor
Carleton S. Marden
by Roberts, Cushman & Grover
att'ys.

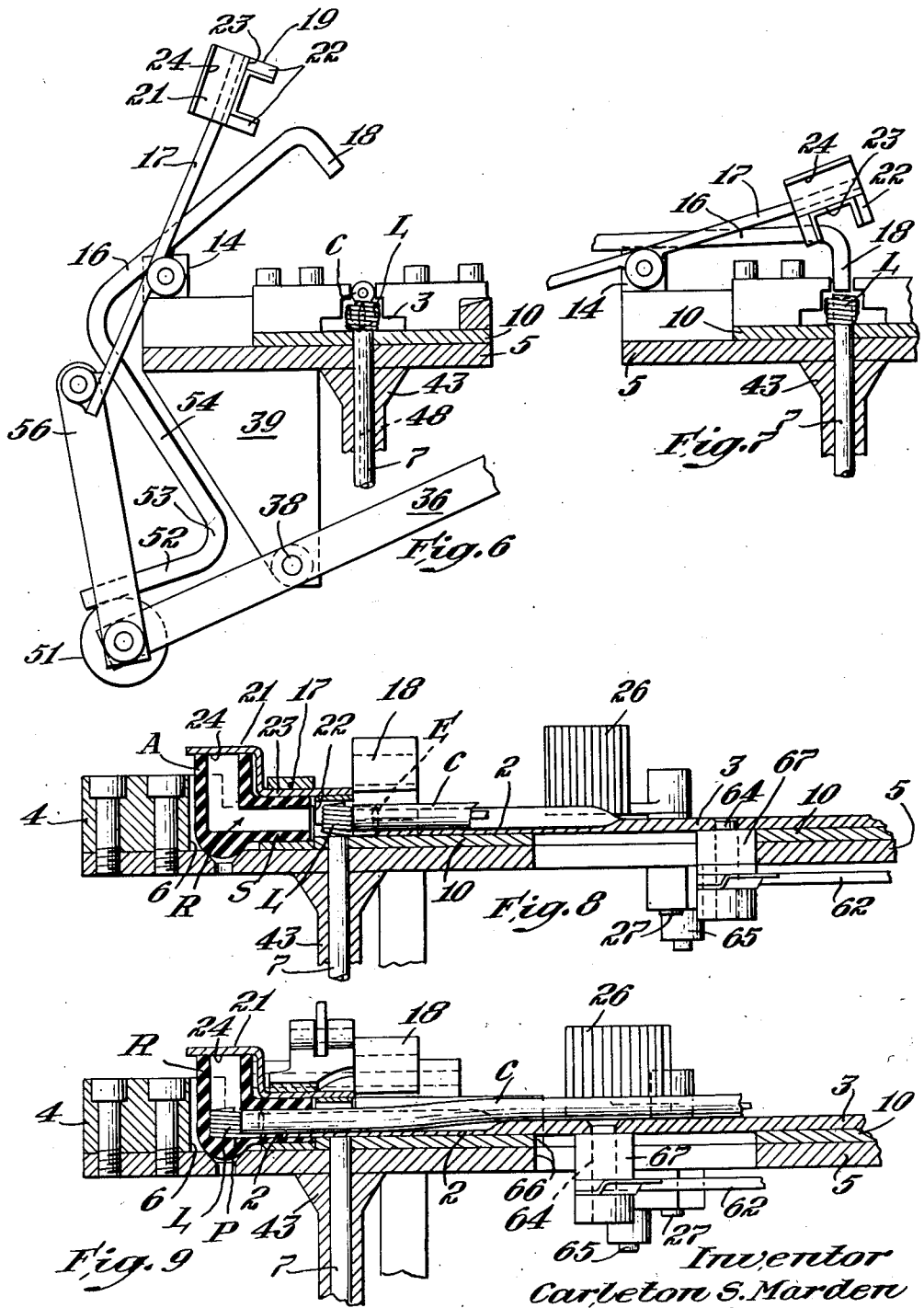

United States Patent Office 2,786,263
Patented Mar. 26, 1957

2,786,263

APPARATUS FOR ASSEMBLING SHEATHED CABLE CONNECTORS

Carleton S. Marden, Waltham, Mass., assignor to National Products Corporation, Boston, Mass., a corporation of Massachusetts Application January 7, 1953, Serial No. 330,086

12 Claims. (Cl. 29—206)

This invention relates to the art of attaching a sheathed electrical connection to a cable, and particularly to a collar or telescoping clip connector carrying an anchoring extension and adapted to be attached to the cable by penetration of or gripping of the cable and to be sheathed by insertion in an insulating sleeve. This type of connection may be used, for example, with a distributor harness comprising a plurality of ignition cables intended to be connected to the spark plugs of a gasoline motor. In this case the collar resiliently grips the spark plug binding post connecting the cable thereto, and the sleeve protects the connection from corrosion and short circuiting.

One object of the present invention is to provide a machine capable of mass production assembly of the cable, collar and sleeve. Another object is to provide an economically manufactured machine which is at the same time reliable in use and not injurious to the various parts to be assembled.

In one aspect the apparatus comprises a jig for holding the sleeve in position to receive the collar and cable, a guideway for holding one end of the cable axially aligned with and on a path directed toward the sleeve, a collar support or holder such as a vise or a plunger disposed between the jig and the guideway and adapted to hold the collar prior to attachment with the cable so that its anchoring extension is directed radially toward the cable, an attacher adapted to be moved towards the guideway and to secure the aforesaid anchoring extension to the cable and thereby fix the collar on the end of the cable, actuating means for retracting the attacher away from the guideway after the collar is attached to the cable, and advancing means for inserting the cable and collar along said path into the sleeve. Preferably the apparatus is provided with guide means which may be moved to a position adjacent the path of the collar and cable after the sleeve is placed in the jig so as to direct the collar and cable into the sleeve. The guide means and aforesaid support may be connected by a mechanical linkage which operates to move the guide means into position after the retracting means has withdrawn the support from the collar. A hold-down member may be fixed relatively to the guide means so as to move towards the jig and hold the sleeve fixed relative to the path of the collar and cable while the guide means directs the collar and cable along the aforesaid path into the sleeve. In a specific aspect the support comprises a plunger adapted to be retractably mounted in a position which extends into the aforesaid path and adjacent the path and the plunger is designed to receive the collar telescopingly and hold it adjacent said path, the attacher comprising a presser for causing the anchoring extension to penetrate or grip the cable. Preferably the plunger and presser are connected by coordinating means so that the plunger is partially retracted as the presser attaches the clip to the cable and thereafter retracts the plunger wholly from the path and lifts the presser from the collar.

In a further aspect the plunger has a passage extending through it and is connected to an oil pump which is actuated by retraction of the plunger so as to extrude oil from said passage onto the collar and thereby lubricate the collar and facilitate its insertion into the sleeve.

In another aspect the aforesaid advancing means comprises a slider which advances the guideway as well as the cable and collar into the sleeve. Preferably the guideway comprises a thin walled trough-like member extending forwardly from the slider substantially the distance that said cable enters the sleeve. More specifically the collar has a portion projecting radially of the cable after it has been affixed to the cable and the guideway member has a forwardly facing abutment which engages such projecting collar portion so as to urge the clip and cable along the aforesaid path into the sleeve when the slider advances the guideway member. Since the guideway may tend to carry the collar and cable out of the sleeve when the guideway is withdrawn from the sleeve a clamp is provided for gripping the cable while the guideway is withdrawn from the sleeve. The clamp may be linked to the slider by mechanism synchronizing the slider and clamp so as to actuate the clamp after the slider has advanced the cable and collar into the sleeve.

For the purpose of illustration a typical embodiment of the invention is shown in the accompanying drawings in which Fig. 1 is a plan view of the apparatus;

Fig. 2 is a side elevation;

Figs. 6 and 7 are enlarged sectional views on line 6—7 of Fig. 1; and

Figs. 8 and 9 are enlarged sectional views on line 8—9 of Fig. 1.

Figure 5:
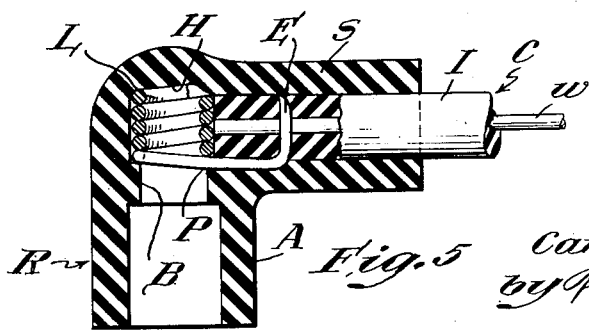
Fig. 5 is a sectional view showing the collar, cable and sleeve assembly.

A typical connection assembled according to the present invention is shown in Fig. 5 and comprises a cable C having a conducting wire W and insulation I, a helical spring collar L having a pointed extension E adapted to penetrate the insulation I and contact the wire W, and a resilient sheath R having a sleeve S receiving and enclosing the collar L and cable C and an arm A adapted to fit over the insulating post of a spark plug when the collar L telescopingly grips the binding post of the plug. An abutment B forming a retaining chamber H for the collar L may be provided as shown in Fig. 5, or may be omitted as shown in Fig. 8 or 9.

In the embodiment shown for the purpose of illustration the apparatus comprises a box-like frame 1 on which the operating mechanism is mounted. This mechanism includes a guideway 2 carried on a slider 3, although it will be apparent that the guideway need not be a part of the slider 3. The guideway 2 is directed toward a jig 4 having a seat 6 conforming to the exterior of the sheath R and adapted to hold the sheath in an inverted position with its sleeve S directed toward the guideway 2. Mounted on the top of the box-like frame 1 is a base plate 5. Extending part way along the base plate 5 is a table 10 which overhangs the frame 1 at one end. Attached to the table 10 are two guide plates 11 and 12 between which the slider 3 is guided. Extending upward through an opening 13 in the base plate is a plunger 7 which reciprocates from a position between the guideway and jig and slightly above the guideway and jig to a position flush with the upper surface of the table 10.

The guideway 2 is designed to receive the cable C with the end of the cable substantially even with the forward end of the slider 3, as shown in Fig. 8. The plunger 7 receives the coiled spring collar clip L telescopingly and holds it with the pointed extension E directed toward the end portion of the cable C.

At the back side of the base plate 5 is a support 14 providing a pivot for an S-shaped presser lever 16 and a holddown lever 17. At the upper end of lever 16 is a striker or presser member 18 which swings with the lever toward and away from the forward end of the guideway 2. The upper end of the hold-down lever carries a guide piece 19 and a hold-down member 21, which swing with lever 17 toward the jig seat 6. The guide piece 19 comprises two converging walls 22. The hold-down member has a lower face 23 and an upper face 24. A clamping member 26 is pivoted on a shaft 27 extending to the guide plate 11 so as to swing across the top of the slider 3 into close relation with a cooperative clamping member 29 which extends upwardly from the guide plate 12.

Adjacent the base plate 5 a cover plate 31 having a housing 32 covers part of the presser lever 16 and the hold-down lever 17 and the operating mechanism for these levers. The interior of the box-like frame 1 is designed to serve as a reservoir for oil O. An oil cap 33 affords access to the reservoir for measuring and filling.

Two hand levers 36 and 37 are provided for actuating the operating parts mentioned above. Lever 36 actuates the presser lever 16, the hold-down lever 17 and the plunger 7. Hand lever 37 actuates the slider 3 and clamping member 26.

Lever 36 is pivoted at 38 on a bracket 39 depending from the base plate 5. An L-shaped strap 41 attached to the lever 36 loosely surrounds the plunger 7 between two abutments 42 on the plunger 7 which is guided in a sleeve 43 depending from the base plate 5. The lower end of the plunger 7 carries a piston 44 reciprocating in a cylinder 45. The cylinder 45 has a longitudinal slot 46 for admitting oil to a well 47 within the cylinder. Operation of the lever 36 drives the piston 44 into the well section 47 causing a small amount of oil to be forced upwardly through the respective internal passages 48 (Fig. 6) and 49 (Fig. 3) of the plunger 7 and the piston 44.

A bifurcated portion of lever 36 carries a roller 51 engaging the lower arm 52 of the S-shaped lever 16. When the lever 36 swings the roller 51 upwardly the presser lever 16 is swung clockwise against the force of a spring 50 rapidly until the roller 51 reaches the shoulder 53 of lever 16. As the roller 51 rounds the elbow 53 swinging movement of lever 16 is arrested and as the roller reaches the middle arm 54 of lever 16 a very slight counterclockwise motion applied to the lever 16 by the spring 50 is allowed. At the same time lever 36 which is connected by a toggle 56 to the hold-down lever 17 swings the hold-down lever clockwise to the position shown in Fig. 8 and, as the roller 51 rides onto arm 54, to the position shown in Fig. 9.

As the presser lever 16 approaches its further clockwise limit the presser element 18 forces the pointed extension E through the cable C. Thereafter the slight counterclockwise motion of the presser lever 16 lifts the presser element 18 just clear of the cable. Thereafter the lever 36 swings the hold-down lever 17 to the position shown in Fig. 9 in which the guide walls 22 of the guide pin 19 are at each side of a path to be followed by the collar L and cable C into the sleeve S of the resilient sheath R, the walls 22 converging toward the opening through the sleeve S. Simultaneously the lower face 23 of the hold-down device 21 bears on the sleeve S and the upper face 24 bears on the end of arm A of the sheath R thereby holding the sheath R in the jig 6.

Figure 4:
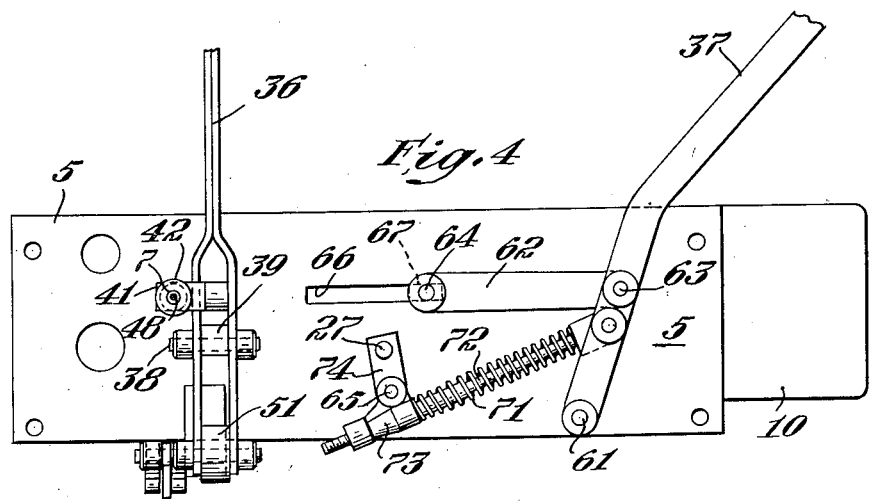
Fig. 4 is an inverted plan view showing details of the mechanism.

The other arm 37 which actuates the slider 3 and clamping member 26 is pivoted on a lug 61 on the underside of the base plate 5. A toggle link 62 is pivoted to the lever 37 at 63 and to the slider 3 by a pin 64 extending through a slot 66 in the base plate 5 and table 10. The pin 64 is steadied in the slot 66 by a block 67. The lever 37 is connected to the axle 27 of the clamping member 26 by a yielding linkage comprising a helical spring 71 surrounding a guide rod 72, and a sleeve 73 linked to the shaft 27 by a crank arm 74 the sleeve 73 being pivoted to the crank arm 74 by a pin 65. When the lever 37 is moved counterclockwise as shown in Fig. 4 (clockwise as viewed from above the apparatus) the guide rod 72 slides through the sleeve 73 allowing the coil spring 71 yieldingly to urge the sleeve crank arm 74 clockwise. The clamping member 26 is thereby yieldingly urged against the cooperating member 29.

When the lever 37 is moved clockwise as shown in Fig. 1 or counterclockwise as viewed in Fig. 4 the slider 3 and guideway 2 are advanced from the position shown in Figs. 1, 2 and 8 to the position shown in Fig. 9.

The operation of the apparatus is shown in Figs. 6 to 9. The spring collar L is first telescoped over the plunger 7 with the pointed extension E directed upwardly. The cable C is then laid in the trough 2 with its end resting on the extension E flush with the end of the trough. The coil spring is shown in its initial position in Fig. 6. The resilient sleeve R may be placed inverted in the jig 6 at any time. When lever 36 is swung downward the presser member swings from the position shown in Fig. 6 to the position shown in Fig. 7 and thereby pressing the cable end so as to drive the pointed extension E of the coil spring L into the cable C as shown in Fig. 8. Simultaneously the plunger 7 is pulled downward to avoid interference with the presser member 18.

With this initial motion of lever 36 the hold-down member 21 swings to the position as shown in Fig. 7. When the lever 36 is fully depressed the roller 51 has rounded the corner 53 of the presser lever allowing the presser member 18 to rise slightly above the cable C, and as the roller rides along arm 54 of lever 16 the hold-down lever 17 advances the hold-down faces 23 and 24 into contact with the sleeve S and the arm A of the resilient sheath R. At the same time the plunger 7 is withdrawn from its intermediate position as shown in Fig. 7 to the fully retracted position shown in Figs. 8 and 9 below the level of the trough-like guideway 2. As the plunger 7 is retracted from the position shown in Fig. 7 to the position shown in Fig. 8 the piston (Fig. 3) is driven into the well portion of the cylinder 45 and a small amount of oil is thereby pumped upwardly through the plunger and on the collar L.

The other hand lever 37 is then actuated to advance the slider 3 and guideway 2 to the left as shown in Figs. 1, 8 and 9. As shown in Fig. 9 the forward edge of the slider 3 engages the collar L so as to draw the collar and cable C to which it is attached along with the guideway 2. The converging wall 22 of the guide member on the hold-down lever prevents the collar L from pivoting on its extension E out of alignment with the opening of the sleeve S. As the lever 37 is advanced to its extreme left position the slider, collar and cable C are driven into the sleeve S until the collar L seats in the sleeve. The small amount of oil deposited on the coil lubricates the collar as it enters the sleeve S. At the end of its leftward movement the lever 37 swings the clamping member 26 against its cooperative member 29 so as to grip the cable C without interfering with movement of the slider 3. That is, the guideway 2 moves with the slider 3 forward of the path of the clamping member 26 which swings over the slider 3. When the lever 37 is thereafter moved to the left the slider is withdrawn from the resilient sheath R but the cable C and collar L, being held by clamping members 26 and 29 and the resilient nature of the sheath R, remain in the sheath in the position shown in Fig. 9 until the forward edge of the slider 3 is fully withdrawn from the sleeve S. Then, before the slider 3 returns to the extreme right position of Figs. 1, 2 and 8, the clamping member 26 is swung away from the cable C and clear of the guideway 2, as shown in Figs. 1 and 8.

Figure 3:
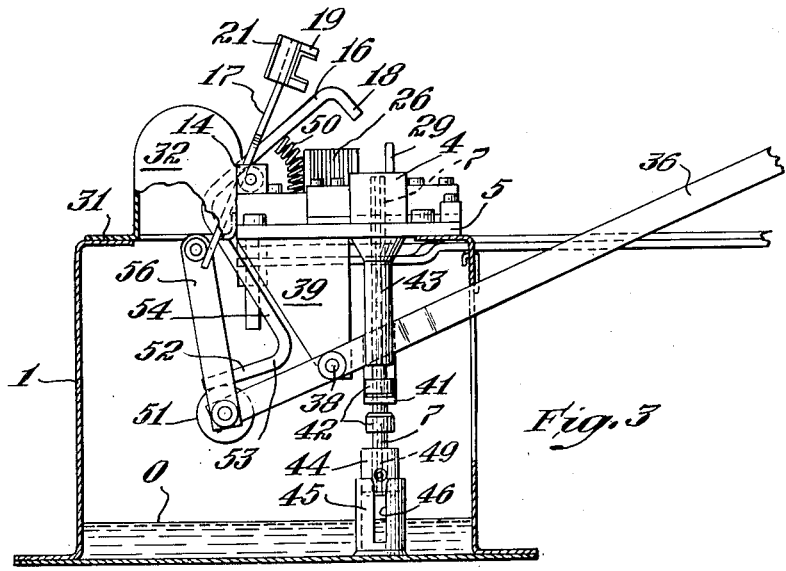
Fig. 3 is an end elevation with parts broken away.

After the lever 37 is returned to its original position as shown in Fig. 1 the bifurcated lever 36 is raised to its uppermost position as shown in Fig. 3 leaving the assembly of collar L, cable C and sleeve R lying unrestrained in the guideway and jig so that they may be lifted out in assembled condition.

It should be understood that the present disclosure is for the purpose of illustration only and that this invention includes all modifications and equivalents which fall within the scope of the appended claims. For example levers 36 and 37 need not be hand operated, but may be actuated by one or more power driven mechanisms.

I claim:

1. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with the sleeve, a holder on the frame between the jig and guideway for holding the collar with said anchoring means directed toward the cable, attaching means movably attached to the frame for securing the anchoring means to the cable thereby fixing the collar on the end of the cable, means on the frame for retracting the holder from said collar, and means movable on the frame toward said jig for advancing said cable and collar into the sleeve.

2. For attaching a metal collar to an insulated cable, said collar having a pointed extension for radial penetration of the cable, and for assembling the collar and cable end in a sleeve, apparatus comprising a frame a jig on the frame for holding the sleeve, a guideway on the frame directed toward said jig for holding the cable end axially aligned with the sleeve, a plunger reciprocally mounted on the frame between the jig and guideway for holding the collar with said extension directed radially toward the cable, means movably attached to the frame for driving the pointed extension into the cable thereby fixing the collar on the end of the cable, means on the frame for retracting the plunger from between the jig and guideway, and means movable on the frame toward said jig for advancing said cable and collar into the sleeve.

3. For attaching a metal collar to an insulated cable, said collar having a pointed extension for radial penetration of the cable, and for assembling the collar and cable end in a flexible sleeve, apparatus comprising a frame, a jig on the frame for holding the sleeve, a guideway on the frame directed toward said jig for holding the cable end axially aligned with the sleeve, a plunger reciprocally mounted on the frame between the jig and guideway for holding the collar with said extension directed radially toward the cable, a presser movable on the frame toward the guideway for driving the pointed extension into the cable thereby fixing the collar on the end of the cable, means movably attached to the frame for retracting the plunger from between the jig and guideway, and means movable on the frame toward said jig for advancing said cable and collar into the sleeve.

4. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with and on a path leading into the sleeve, a holder on the frame between the jig and guideway for holding the collar with said anchoring means directed toward the cable, attaching means on the frame for securing the anchoring means to the cable thereby fixing the collar on the end of the cable, means movably attached to the frame for retracting the holder from said collar, means movable on the frame toward said jig for advancing the cable and collar into the sleeve, and guide means supported on the frame and movable to a position adjacent said path for guiding the collar into the sleeve.

5. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with the sleeve, a holder on the frame between the jig and guideway for holding the collar with said anchoring means directed toward the cable, attaching means movable on the frame for securing the anchoring means to the cable thereby fixing the collar on the end of the cable, means movably supported on the frame for retracting the holder from said collar, means movable on the frame toward said jig for advancing the cable and collar into the sleeve, guide means supported on the frame and movable to a position adjacent said path for guiding the collar into the sleeve, mechanical linkage operatively connected to said holder and guide means and operative to move said guide means into position after said retracting means has withdrawn the holder from said collar.

6. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with an on a path leading into the sleeve, a holder on the frame between the jig and guideway for holding the collar with said anchoring means directed toward the cable, attaching means movable on the frame for securing the anchoring means to the cable thereby fixing the collar on the end of the cable, means movably supported on the frame for retracting the holder from said collar, means movable on the frame toward said jig for advancing the cable and collar into the sleeve, guide means supported on the frame and movable to a position adjacent said path for guiding the collar into the sleeve, and a holddown member fixed relatively to the aforesaid guide means and movable therewith toward said jig so as to hold the sleeve in said path while said guide means guides the collar along the path into the sleeve.

7. For attaching a metal collar to an insulated cable, said collar having a pointed extension for radial penetration of the cable, and for assembling the collar and cable end in a flexible sleeve, apparatus comprising a frame, a jig on the frame for holding the sleeve, a guideway on the frame directed toward said jig for holding the cable end axially aligned with and on a path leading into the sleeve, a plunger retractably mounted on the frame in said path between the jig and guideway over which the collar telescopes and is held adjacent said path holding the collar with said extension directed radially toward the cable, a presser movable toward the guideway for driving the pointed extension into the cable thereby fixing the collar on the end of the cable, means movably supported on the frame for retracting the plunger from between the jig and guideway, means movable on the frame toward said jig for inserting said cable and collar into the sleeve, said plunger having a passage therethrough, and an oil pump operatively connected to said passage and actuated by retraction of the plunger for extruding oil from said passage onto said collar to lubricate the collar and facilitate insertion of the collar into the sleeve.

8. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with the sleeve, a support movably mounted on the frame between the jig and guideway for holding the collar with said anchoring means directed toward the cable, attaching means movably supported on the frame for securing the anchoring means to the cable thereby fixing the collar on the end of the cable, means on the frame for retracting the support from said collar, and a slider movable on the frame toward said jig for advancing said guideway, cable and collar along a path into the sleeve.

9. Apparatus according to claim 8 characterized in that said slider comprises a thin walled trough-like member extending forwardly on the slider substantially the distance that said cable enters the sleeve.

10. Apparatus according to claim 9 characterized in that said collar has a portion projecting radially of the cable when fixed thereto, and said slider has a forwardly facing abutment for engaging said projecting portion to urge the collar and cable along said path.

11. For attaching a metal collar to an insulated cable, said collar having means for anchoring the collar to the cable, and for assembling the collar and cable end in a sleeve, apparatus comprising a frame, a jig on the frame for holding the sleeve, a guideway on the frame directed toward said jig for holding the cable end axially aligned with the sleeve, a support movable on the frame between the jig and guideway for holding the collar with said anchoring means directed toward the cable, attaching means movably mounted on the frame for securing the anchoring means to the cable thereby fixing the collar on the end of the cable, means movable on the frame for retracting the support from said collar, a slider movable on the frame into and out of the sleeve in said jig for advancing the collar and cable end into the sleeve, and a clamp movably supported on the frame for gripping said cable while the slider is being withdrawn from the sleeve thereby preventing the collar and cable from being withdrawn from the sleeve with the slider.

12. Apparatus according to claim 11 characterized by synchronizing mechanism linking the slider and clamp for actuating the clamp after the slider has advanced said cable and collar into said sleeve.

References Cited in the file of this patent

UNITED STATES PATENTS

| | | |
|---|---|---|
| 526,597 | Whyte | Sept. 25, 1894 |
| 1,706,005 | Thompson | Mar. 19, 1929 |
| 2,324,925 | Hallowell | July 20, 1943 |
| 2,340,360 | Alden | Feb. 1, 1944 |
| 2,545,756 | Andren | Mar. 20, 1951 |